(12) United States Patent  (10) Patent No.: US 8,482,910 B2
Munakata et al.  (45) Date of Patent: Jul. 9, 2013

(54) DISPLAY MODULE

(75) Inventors: Hirohide Munakata, Kawasaki (JP); Michiko Johnson, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 12/945,173

(22) Filed: Nov. 12, 2010

(65) Prior Publication Data

US 2011/0128684 A1  Jun. 2, 2011

(30) Foreign Application Priority Data

Dec. 1, 2009 (JP) ................................. 2009-273659

(51) Int. Cl.
- *H05K 5/00* (2006.01)
- *H05K 7/00* (2006.01)
- *G06F 1/16* (2006.01)
- *G02F 1/1333* (2006.01)

(52) U.S. Cl.
USPC ............ 361/679.21; 361/679.22; 361/679.26; 349/58; 349/122

(58) Field of Classification Search
USPC ............. 361/679.21, 679.22, 679.26; 349/58, 349/122
See application file for complete search history.

(56) References Cited

U.S. PATENT DOCUMENTS

| | | | | |
|---|---|---|---|---|
| 4,394,067 A | * | 7/1983 | Spruijt et al. | 349/153 |
| 5,130,832 A | * | 7/1992 | Kawaguchi et al. | 349/56 |
| 7,576,976 B2 | * | 8/2009 | Kawano | 361/679.21 |
| 7,697,272 B2 | * | 4/2010 | Choi | 361/679.21 |
| 7,778,014 B2 | * | 8/2010 | Saiki et al. | 361/679.01 |
| 7,965,497 B2 | * | 6/2011 | Kwon et al. | 361/679.21 |
| 2003/0067268 A1 | | 4/2003 | Matsuoka | 313/512 |
| 2005/0094071 A1 | * | 5/2005 | Akiyama et al. | 349/122 |
| 2009/0115942 A1 | * | 5/2009 | Watanabe | 349/96 |
| 2009/0155942 A1 | * | 6/2009 | Kwon et al. | 438/29 |
| 2009/0213314 A1 | * | 8/2009 | Azuma et al. | 349/122 |

FOREIGN PATENT DOCUMENTS

| | | |
|---|---|---|
| JP | 2003-029644 A | 1/2003 |
| JP | 2003-173868 A | 6/2003 |

\* cited by examiner

*Primary Examiner* — Anthony Haughton
(74) *Attorney, Agent, or Firm* — Fitzpatrick, Cella, Harper & Scinto

(57) ABSTRACT

Provided is a display module in which the prevention of ambient light reflection and the protection of a mounting component may be provided in the same process using the same material, to thereby reduce the number of production steps, while preventing the display panel from increasing in size and thickness so that the cost of production may be reduced. The display module includes a display panel including a display element and a mounting component; a protective plate for protecting a display region of the display panel; and a covering material for integrally covering the display region of the display panel and the mounting component, the covering material being disposed between the display panel and the protective plate.

15 Claims, 2 Drawing Sheets

DISPLAY MODULE

BACKGROUND OF THE INVENTION

1. Field of the Invention

The present invention relates to a thin display module to be used as a display of a digital device, and more particularly, to a display module which is modularized integrally with an external circuit.

2. Description of the Related Art

In recent years, various digital devices are equipped with a thin display module which serves as a display. In particular, when the display module is employed for use in a device such as a mobile device which is carried outside, the display screen of the mobile device is required to have high visibility under ambient light. In order to improve the visibility of the display screen of the mobile device, it is necessary to suppress ambient light reflection.

As a method involving suppressing ambient light reflection, Japanese Patent Application Laid-Open No. 2003-173868 proposes to fill a gap between a display panel (device substrate) and a protective plate with oil having an appropriate refractive index, to thereby prevent degradation in visibility due to interface reflection to be caused between the display panel and the protective plate. Alternatively, Japanese Patent Application Laid-Open No. 2003-29644 proposes to intimately adhere the display panel and the protective plate to each other across one or more layers of a transparent adhesive material.

Further, a display module which includes a mounting component, such as an external IC (integrated circuit), mounted on a display panel has come into widespread use. In such a display module, the mounting component needs to be covered with a protective film after being mounted, to thereby protect the mounting component.

FIG. 4 is a schematic cross-sectional view illustrating an example of a configuration of a display module. FIG. 4 illustrates a polarizing plate 21, a protective plate 22, a filler 23, a sealing member 24, a mounting component (external IC) 25, a display panel 26, a casing 27, a circuit protective resin 28, and a FPC (flexible printed circuit) 29.

In the display module illustrated in FIG. 4, the filler 23 is filled between the display panel 26 and the protective plate 22 for the purpose of suppressing ambient light reflection occurring at an interface between the display region of the display panel 26 and the protective plate 22. Further, for protection of the mounting component 25 such as an external IC, the protective resin 28 separately covers the mounting component 25, to thereby protect the mounting component 25.

Meanwhile, in the conventional display module, the filler 23 is filled in a gap forming the interface between the display region of the display panel 26 and the protective plate 22 for the purpose of preventing ambient light reflection, while the protective resin 28 is separately employed to cover the mounting component 25 for protection. Accordingly, the films in the display region of the display panel 26 and in the mounting component 25 are formed of different materials in different processes, which leads to a problem that the number of production steps increases. Further, the mounting component 25 is not disposed in proximity to the effective display region, which leads to another problem that the display panel is increased in size and thickness, resulting in an increase in cost of production.

SUMMARY OF THE INVENTION

In view of the above-mentioned problems, the present invention has been made, and therefore it is an object of the present invention to provide a display module in which the prevention of ambient light reflection and the protection of a mounting component may be provided in the same process using the same material, to thereby reduce the number of production steps, while preventing the display panel from increasing in size and thickness so that the cost of production may be reduced.

In order to achieve the above-mentioned object, the present invention employs the following configuration. The display module of the present invention includes: a display panel including a display element and a mounting component; a protective plate for protecting a display region of the display panel; and a covering material for integrally covering the display region of the display panel and the mounting component, the covering material being disposed between the display panel and the protective plate.

According to the present invention, the display region of the display panel and the mounting component are covered with the same covering material, and hence the prevention of ambient light reflection and the protection of the mounting component may be provided in the same process using the same material. Accordingly, the present invention produces an excellent effect that the number of steps for producing the display module may be reduced while preventing the display panel from increasing in size and thickness so that the cost of production may also be reduced.

Further features of the present invention will become apparent from the following description of exemplary embodiments with reference to the attached drawings.

DESCRIPTION OF THE EMBODIMENTS

In the following, embodiments of the present invention are described with reference to the drawings.

However, the present invention is not limited to the embodiments.

<First Embodiment>

Figure 1:
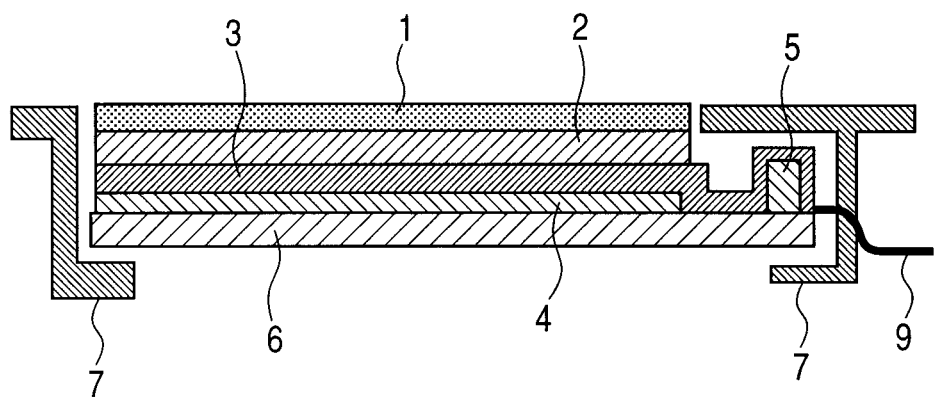
FIG. 1 is a schematic cross-sectional view illustrating a configuration of a display module according to a first embodiment of the present invention.

First, with reference to FIG. 1, a first embodiment of a display module according to the present invention is described. FIG. 1 is a schematic cross-sectional view illustrating a configuration of the display module according to the first embodiment. FIG. 1 illustrates a polarizing plate 1, a protective plate 2, a filler 3, a sealing member 4, a mounting component (external IC) 5, a display panel (device substrate) 6, a casing 7, and wiring FPC 9.

As illustrated in FIG. 1, the display module according to the first embodiment includes the display panel 6 for displaying characters and images. The display panel 6 includes multiple display elements, which are arranged two-dimensionally on a substrate. The display elements form an effective display region of the display panel 6 and are sealed with the sealing member 4. Further, the display module according to the first embodiment includes the protective plate 2 for protecting the display region of the display panel 6 and the polarizing plate 1 disposed on the protective plate 2.

The first embodiment employs a display panel which includes, as the display elements forming the display panel 6, for example, an OLED (organic light emitting diode) display element serving as a light emitting element. However, the present invention is not limited thereto. In the OLED display element, for example, an anode electrode, a hole transport layer (HTL), a light emitting layer (EML), an electron transport layer (ETL), a cathode electrode, and the like are formed by laminating metal, a metallic alloy, an organic material, or an organic compound. However, the structure and the number of the layers may be varied depending on the material. The organic material and the organic compound are reduced in light emitting efficiency due to moisture in the air, and hence need to be sealed with the sealing member 4 such as a substrate, a cap, or a film.

The sealing member 4 may include, for example, a glass plate, glass having a portion corresponding to the display region formed in a concave shape, a resin film (organic film), an inorganic film, a multilayer film of a resin and an inorganic film, or a resin plate. However, the present invention is not limited thereto.

The mounting component 5 such as an external IC is mounted on the substrate forming the display panel 6. The mounting component 5 is disposed outside the display region on the substrate, and connected to a drive circuit (not shown) of the display panel 6. The mounting component 5 may include, for example, an integrated circuit (IC) in a chip form, a chip resistor, and a chip capacitor.

As described above, the protective plate 2 is disposed above the display panel 6 in which the display elements are sealed with the sealing member 4 so that the display region of the display panel 6 is protected. The protective plate 2 may be formed of, for example, a transparent member such as an acrylic resin (polymethylmethacrylate (PMMA)), polycarbonate (PC), or glass. However, the present invention is not limited thereto.

The filler 3 is filled in a gap between the display panel 6, in which the display elements are sealed with the sealing member 4, and the protective plate 2, in order to prevent ambient light reflection. In the display module according to the first embodiment, the filler 3 covers not only the effective display region of the display panel 6 but also the external IC 5. It should be noted that the filler 3 may not necessarily be formed across the entire surface of the substrate, as long as the filler 3 is formed at least on the effective display region of the display panel 6 and on the external IC 5.

It is preferred that the filler 3 employ a material which has a refractive index close to the refractive index of the protective plate 2 in order to prevent ambient light reflection. For example, when the protective plate 2 is formed of an acrylic resin (PMMA), it is preferred that the same acrylic resin (PMMA) be used for the filler 3.

The filler 3 may preferably be formed through, for example, screen printing in order to prevent the filler 3 from adhering to a terminal portion of the external IC 5. Specifically, a mixture of a monomer, a polymer, and a curing agent, which serves as a material for the filler 3, is applied to the display region and the mounting region of the mounting component 5 in the same process, and then the protective plate 2 is tightly attached onto the filler 3.

There may be employed another method of forming the filler 3. For example, a dispenser may be used to apply the filler 3. When this method is applied to a case of forming the filler 3 on the display panel 6 in a particularly large size, the material loss may be reduced, to thereby reduce the cost of production. Further, as a method of fixing the filler 3 after the protective plate 2 is disposed thereon, there may be selectively employed a method, such as a thermal curing method, a two-part mixed curing method, a drying method, or a combined method of ultraviolet (UV) curing and thermal curing, depending on the material of the filler 3. In particular, in a case where the filler 3 is fixed by the application of heat, the filler 3 may preferably to be subjected to annealing and aging.

On the protective plate 2, the polarizing plate 1 is disposed in order to prevent ambient light reflected at a reflecting electrode from coming outside the panel. As the polarizing plate 1, for example, a circularly polarizing plate may be preferred to be adopted. However, the present invention is not limited thereto, and a color filter substrate may be employed. The polarizing plate 1 may be disposed on the backside of the protective plate 2.

The display panel 6, the sealing member 4, the filler 3, the protective plate 2, and the polarizing plate 1, including the mounting component 5, are surrounded by the casing 7 formed of, for example, metal in the form of frame so that the display region may be viewable. Further, the FPC 9 is connected to the terminal portion of the mounting component 5, extending outside the casing 7.

In the display module configured as described above according to the first embodiment, the filler 3 serving as a covering material to be filled in the gap between the display panel 6 and the protective plate 2 integrally covers the display region of the display panel and the mounting component (external IC) 5, which eliminates the need to cover the mounting component (external IC) 5 separately with a specific protective resin. In other words, the prevention of ambient light reflection and the protection of the mounting component 5 may be provided in the same process using the same material, to thereby reduce the number of production steps, while preventing the display panel from increasing in size and thickness so that the cost of production may be reduced.

<Second Embodiment>

Figure 2:
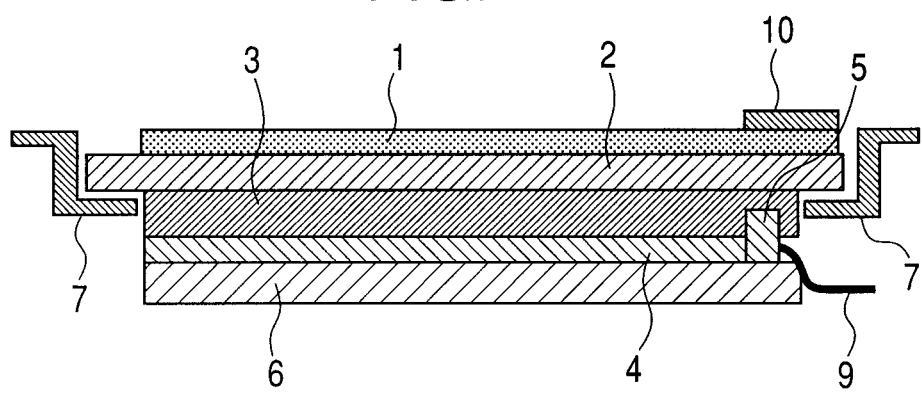
FIG. 2 is a schematic cross-sectional view illustrating a configuration of a display module according to a second embodiment of the present invention.

Next, with reference to FIG. 2, a second embodiment of a display module according to the present invention is described. FIG. 2 is a schematic cross-sectional view illustrating a configuration of the display module according to the second embodiment. It should be noted that description of the configuration same as that of the first embodiment is omitted as appropriate, and the same members are denoted by the same reference symbols for description.

As illustrated in FIG. 2, in the display module according to the second embodiment, the mounting component (external IC) 5 is disposed in proximity to the sealing member 4 covering the display region of the display panel 6 so that the mounting component 5 comes into direct contact with the sealing member 4. In the second embodiment, the display panel 6 is thin, and hence the mounting component 5 protrudes upward from the display panel 6 sealed with the sealing member 4.

Accordingly, the filler 3 is provided so as to have a thickness equal to or larger than the difference between a highest portion of the mounting component 5 and a lowest front surface portion of the sealed display panel 6 so that the mounting component 5 and the protective plate 2 do not interfere with each other. Further, the gap between the sealing member 4 and the mounting component 5, and the protective plate 2 is filled with the filler 3, to thereby prevent interface reflection from occurring. It should be noted that the highest portion of the mounting component 5 corresponds to a surface facing to the protective plate 2, of the mounting component 5, and the lowest portion of the display panel 6 corresponds to a surface facing to the protective plate 2, of the sealing member 4 provided to the display panel 6.

Further, on the polarizing plate 1 of the display module according to the second embodiment, a light shielding coating layer 10 is formed. The light shielding coating layer 10 is laminated, on the polarizing plate 1, outside the effective display region of the display panel 6. The light shielding coating layer 10 may be laminated on the backside of the protective plate 2.

The second embodiment basically produces the same function and effect as those of the first embodiment. In the second embodiment, the mounting component (external IC) 5 is disposed as being in contact with the sealing member 4 of the display panel 6 so that the thickness of the filler may be adjusted. Accordingly, the display module according to the second embodiment may be made further compact in module size, as compared to the display module of the first embodiment. Further, on the polarizing plate 1, the light shielding coating layer 10 is laminated outside the effective display region of the display panel 6, and hence the display module of the second embodiment may produce a unique effect of improving visibility of the display screen as compared to the display module of the first embodiment.

<Third Embodiment>

Figure 3:
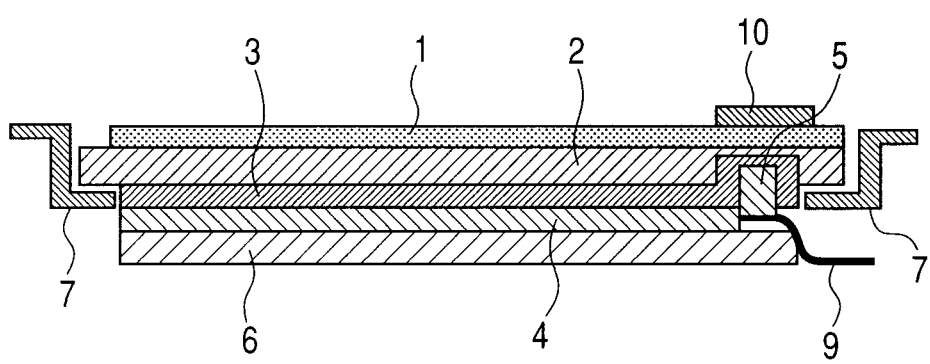
FIG. 3 is a schematic cross-sectional view illustrating a configuration of a display module according to a third embodiment of the present invention.
Figure 4:
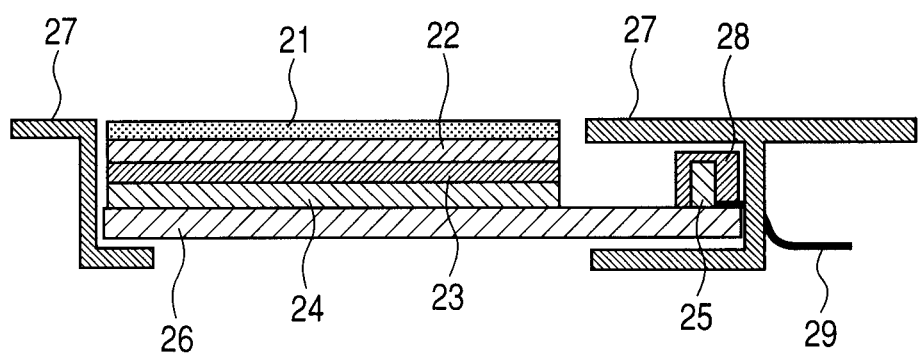
FIG. 4 is a schematic cross-sectional view illustrating an example of a configuration of a conventional display module.

Next, with reference to FIG. 3, a third embodiment of a display module according to the present invention is described. FIG. 3 is a schematic cross-sectional view illustrating a configuration of the display module according to the third embodiment. It should be noted that description of the configuration same as that of the first embodiment and the second embodiment is omitted as appropriate, and the same members are denoted by the same reference symbols for description.

As illustrated in FIG. 3, in the display module according to the third embodiment, similarly to the second embodiment, the mounting component (external IC) 5 is disposed in proximity to the sealing member 4 covering the display region of the display panel 6 so that the mounting component 5 comes into direct contact with the sealing member 4. However, the third embodiment is different from the second embodiment in that the protective plate 2 has a recessed portion formed in an area corresponding to the external IC 5, and a protruding portion of the external IC is received inside the recessed portion so as not to interfere with the protective plate 2. When the recessed portion is formed in the protective plate 2 as described above, the filler 3 may be reduced in thickness as compared to the second embodiment, and hence the reduction of transmittance due to the filler 3 may be suppressed. Specifically, the filler 3 may be provided in a thickness equal to or smaller than the difference between the highest portion of the mounting component 5 and the lowest portion of the sealed display panel 6.

Further, similarly to the second embodiment, the light shielding coating layer 10 is formed on the polarizing plate 1 as being disposed outside the effective display region of the display panel 6.

The third embodiment basically produces the same function and effect as those of the first embodiment. Similarly to the display module of the second embodiment, the display module according to the third embodiment may be made further compact in module size as compared to the display module of the first embodiment. Further, the display module of the third embodiment includes the light shielding coating layer 10 laminated in a similar manner as in the second embodiment, and hence the visibility of the display screen may be improved as compared to the display module of the first embodiment.

In particular, in the display module according to the third embodiment, the protective plate 2 has the recessed portion formed therein for receiving the protruding portion of the mounting component (external IC) 5. Accordingly, as compared to the display module of the second embodiment, the display module of the third embodiment may produce a unique effect that the filler 3 may be reduced in thickness so that the total thickness of the module may be reduced, and hence the reduction of transmittance due to the filler 3 may be suppressed.

In the above, the exemplary embodiments of the present invention have been described. Those embodiments are merely exemplified for description of the present invention, and the present invention may be implemented in various embodiments different from the above-mentioned embodiments, without departing from the gist of the present invention.

For example, in the above-mentioned embodiments, an OLED display is exemplified as the display panel 6. However, a liquid crystal display, a plasma display panel (PDP), or electronic paper may be adopted.

Further, in the case of using a resin film for the sealing member 4, the resin film may also be used for the filler (covering material) 3. In this case, the number of production steps may further be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-273659, filed Dec. 1, 2009, which is hereby incorporated by reference herein in its entirety.

What is claimed is:

1. A display module comprising:
    a display panel including an OLED display element and a mounting component;
    a sealing member covering the OLED display element;
    a protective plate for protecting a display region of the display panel; and
    a filler filling a gap between the sealing member and the protective plate and integrally covering the display region of the display panel and the mounting component,
    wherein the display panel, the sealing member, the filler, and the protective plate are stacked in this order.

2. The display module according to claim 1, wherein the mounting component is in direct contact with the sealing member.

3. The display module according to claim 2, wherein the filler in the display region has a thickness equal to or larger than a difference between a highest portion of the mounting component corresponding to a surface facing the protective plate and a lowest front surface portion of the sealing member corresponding to a surface facing the protective plate, and
    wherein the filler fills a gap between the mounting component and the protective plate.

4. The display module according to claim 1, wherein the protective plate has a recessed portion formed therein for receiving the mounting component, the recessed portion being formed in an area corresponding to the mounting component.

5. The display module according to claim 4, wherein the filler has a thickness equal to or smaller than a difference between a highest portion of the mounting component corresponding to a surface facing the protective plate and a lowest front surface portion of the display panel sealed with the sealing member corresponding to a surface facing the protective plate, and wherein the filler fills a gap between the mounting component and the protective plate.

6. The display module according to claim 1, wherein the filler is acrylic resin.

7. The display module according to claim 1, further comprising a polarizing plate disposed on the protective plate.

8. The display module according to claim 7, wherein the polarizing plate is disposed on a surface of the protective plate opposite to the display panel.

9. The display module according to claim 7, wherein the polarizing plate is disposed on a surface on the display panel side of the protective plate.

10. The display module according to claim 1, further comprising a color filter.

11. The display module according to claim 1, further comprising a light shielding coating layer disposed outside the display region of the display panel.

12. The display module according to claim 11, wherein the light shielding coating layer covers the mounting component.

13. The display module according to claim 11, further comprising a polarizing plate disposed on the protective plate, wherein the light shielding coating layer is disposed on the polarizing plate.

14. The display module according to claim 11, wherein the light shielding coating layer is disposed on the protective plate.

15. The display module according to claim 1, wherein the filler is in direct contact with the mounting component.

* * * * *